S. GILZINGER.
Vehicle-Spring.

No. 169,254. Patented Oct. 26, 1875.

WITNESSES: INVENTOR:
Sebastian Gilzinger

UNITED STATES PATENT OFFICE.

SEBASTIAN GILZINGER, OF RONDOUT, NEW YORK, ASSIGNOR TO HIMSELF AND ABEL A. CROSBY, OF SAME PLACE.

IMPROVEMENT IN VEHICLE-SPRINGS.

Specification forming part of Letters Patent No. 169,254, dated October 26, 1875; application filed September 17, 1875.

CASE B.

*To all whom it may concern:*

Be it known that I, SEBASTIAN GILZINGER, of Rondout, in the county of Ulster and State of New York, have invented a new and useful Improvement in Vehicle-Springs; and that the following is a full, clear, and exact description of the same, reference being had to the accompanying drawings, and to the letters of reference marked thereon, making a part of this specification.

This invention is in the nature of an improvement in vehicle-springs; and the invention consists in a coiled spring for vehicles, constructed of an endless piece of metal, or with the ends of the piece of metal from which the spring is constructed united together, substantially in the manner and for the purpose hereinafter described.

Figure 1:
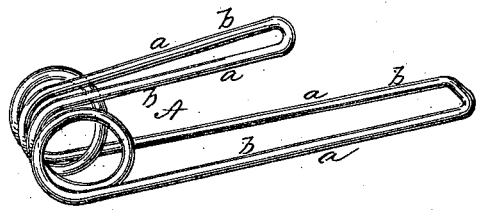
Figure 2:
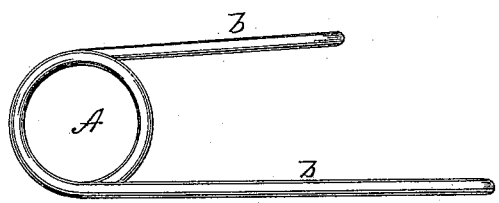

In the accompanying sheet of drawings, Figure 1 is a perspective view of my coiled spring. Fig. 2 is a side view, and Fig. 3 a plan or top view, of same.

Similar letters of reference indicate like parts in the several figures.

Figure 3:

A represents a coiled spring for vehicles. This spring may be made of any suitable metal, and may have any desired number of coils. The metal from which it is made is bent in two parallel bars, $a\ a$, and the two ends are then welded together, so that the rod or bar of metal from which the spring is to be made is in the shape of a parallelogram, and this is next properly coiled, as shown in Figs. 1, 2, and 3, around a suitable mandrel, or otherwise. The spring is then complete.

The advantage of uniting the ends of the rod or strip of metal from which the spring is made, so as to make the same endless, is that the spring is not only stiffened by this operation, but it prevents the uncoiled parts $b\ b$ of the spring from spreading, and, besides, affords a more convenient and perfect means of attaching the spring to the vehicle.

Instead of welding the ends of the spring together, they may be secured to a cross-bar by means of nuts and screws, which would produce the same result as if the ends were welded together, but to a limited extent, and the result would not be as satisfactory, nor as cheap.

I do not wish to confine myself to any particular way of joining the ends of the wire or rods of which the coiled springs are made; but What I do claim as new, and desire to secure by Letters Patent, is—

A coiled vehicle-spring constructed of a piece of metal, the ends of which are joined together by welding or otherwise, substantially in the manner and for the purpose described.

SEBASTIAN GILZINGER.

Witnesses:
 H. L. WATTENBERG,
 M. LOVELL.